(12) United States Patent
Ma et al.

(10) Patent No.: US 12,448,595 B2
(45) Date of Patent: Oct. 21, 2025

(54) MECHANICALLY STABLE AND HIGH CELL DENSITY HONEYCOMB RETINAL SCAFFOLD DESIGN FOR TRANSPLANTATION THERAPY OF PHOTORECEPTOR CELLS AND RETINAL PIGMENT EPITHELIUM

(71) Applicant: Wisconsin Alumni Research Foundation, Madison, WI (US)

(72) Inventors: Zhenqiang Ma, Middleton, WI (US); Inkyu Lee, Madison, WI (US); Juhwan Lee, Madison, WI (US); Michael Phillips, Stoughton, WI (US); David Gamm, Waunakee, WI (US); Shaoqin Gong, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 818 days.

(21) Appl. No.: 17/769,549

(22) PCT Filed: Oct. 12, 2020

(86) PCT No.: PCT/US2020/055273
§ 371 (c)(1),
(2) Date: Apr. 15, 2022

(87) PCT Pub. No.: WO2021/076454
PCT Pub. Date: Apr. 22, 2021

(65) Prior Publication Data
US 2024/0132823 A1   Apr. 25, 2024
US 2024/0228931 A9   Jul. 11, 2024

Related U.S. Application Data

(60) Provisional application No. 62/915,926, filed on Oct. 16, 2019.

(51) Int. Cl.
*C12M 1/12* (2006.01)
*C12N 5/0793* (2010.01)

(52) U.S. Cl.
CPC ............ *C12M 25/14* (2013.01); *C12N 5/062* (2013.01); *C12N 2533/30* (2013.01)

(58) Field of Classification Search
CPC ...... C12M 25/14; C12N 5/062; C12N 5/0621; C12N 2533/30; G01N 33/5082
See application file for complete search history.

(56) References Cited

U.S. PATENT DOCUMENTS 6,455,311 B1   9/2002   Vacanti
11,359,175 B2   6/2022   Ohsaka et al.
(Continued)

FOREIGN PATENT DOCUMENTS

| WO | WO-2015030228 A1 * | 3/2015 | ............ C12M 25/02 |
| WO | 2017057234 A1 | 4/2017 | |
| WO | 2019217661 A1 | 11/2019 | |

*Primary Examiner* — Michael L Hobbs
(74) *Attorney, Agent, or Firm* — Steven T. Kazmierski; Sandberg Phoenix & von Gontard, PC

(57) ABSTRACT

Photoreceptor scaffolds that can be used for transplantation of organized photoreceptor tissue, with or without retinal pigment epithelial cells, which may improve grafted cell survival, integration, and functional visual rescue are disclosed herein. The scaffolds include a cell support layer having at least one honeycomb-shaped reservoir fluidly connected to a plurality of through-holes and at least one cell in the at least one honeycomb-shaped reservoir.

15 Claims, 5 Drawing Sheets

(56) References Cited

U.S. PATENT DOCUMENTS

| | | |
|---|---|---|
| 2006/0019326 A1 | 1/2006 | Vacanti et al. |
| 2010/0098742 A1* | 4/2010 | Vacanti .................. C12M 25/02 |
| | | 424/424 |
| 2011/0004304 A1 | 1/2011 | Tao et al. |
| 2011/0257623 A1 | 10/2011 | Marshall et al. |
| 2015/0110756 A1 | 4/2015 | Matsuda et al. |
| 2016/0183990 A1* | 6/2016 | Koizumi ............ A61B 17/8085 |
| | | 606/285 |
| 2017/0226459 A1 | 8/2017 | Ma et al. |
| 2018/0195033 A1 | 7/2018 | Chen et al. |
| 2019/0290803 A1* | 9/2019 | Bharti ..................... A61L 27/18 |
| 2020/0010799 A1 | 1/2020 | Ma et al. |

* cited by examiner

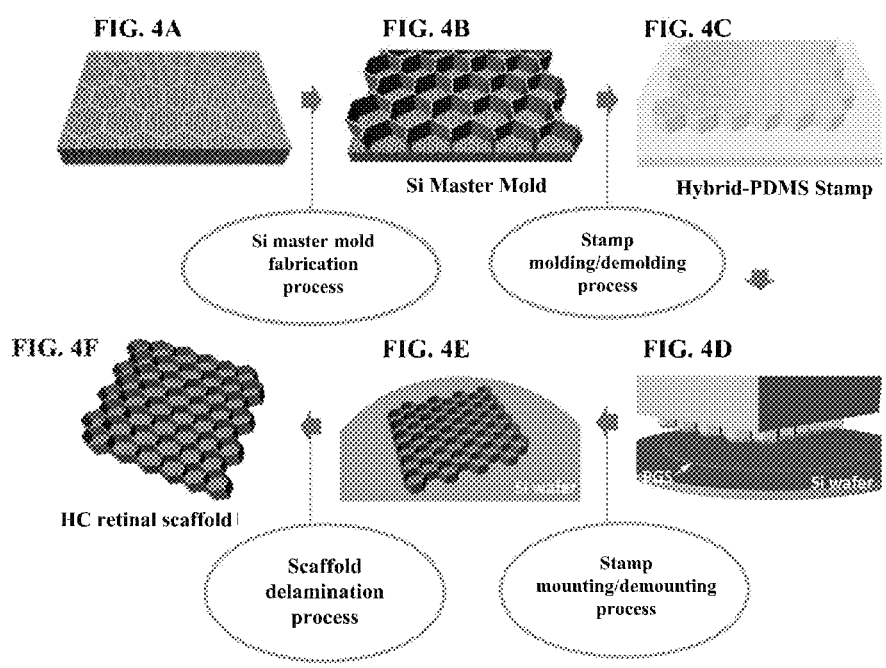

MECHANICALLY STABLE AND HIGH CELL DENSITY HONEYCOMB RETINAL SCAFFOLD DESIGN FOR TRANSPLANTATION THERAPY OF PHOTORECEPTOR CELLS AND RETINAL PIGMENT EPITHELIUM

CROSS-REFERENCE TO RELATED APPLICATIONS

This invention is a national phase application based on PCT/US2020/055273, filed Oct. 12, 2020, which claims priority to U.S. Provisional Application No. 62/915,926, filed Oct. 16, 2019, both of which are hereby incorporated by reference in their entireties.

STATEMENT OF GOVERNMENT SUPPORT

This invention was made with government support under EY025497 and EY027266, each awarded by the National Institutes of Health. The government has certain rights in the invention.

BACKGROUND OF THE DISCLOSURE

The present disclosure relates generally to scaffolds for use in transplantation of organized photoreceptor tissue, with or without retinal pigment epithelium (RPE), which may improve grafted cell survival, integration, and functional visual rescue. Further, these scaffolds can be used in in vitro developmental and disease studies, as well as for drug screening.

A visual impairment is a loss of vision that cannot be corrected by ordinary means such as eyeglasses or contact lens. It is globally estimated that around 1.3 billion people live with some form of visual impairment and the number of people visually impaired is expected to continue to rise, owing to the rapid growth of the aging population. For example, age-related macular degeneration (AMD), a degenerative retinal disease, is a leading cause of severe, irreversible vision loss in people over the age of 60 and occurs when the macula, a small area in the center of the retina, deteriorates. The macula is comprised of numerous light-sensing cells (photoreceptors) and supportive cells (retinal pigment epithelium (RPE)).

Photoreceptors are crucial for vision, and they capture and transduce photons into electrochemical signals to be processed by the retina and visual centers of the brain. Adjacent to the photoreceptors are the RPE, supportive cells required for photoreceptor health and function. All blinding disorders of the outer retina involve dysfunction and eventual degeneration of the photoreceptors, either alone (as occurs in many forms of retinitis pigmentosa) or with involvement of the RPE (e.g., AMD). Currently, these patients have limited to no treatment options. One broadly applicable treatment strategy would be to replace photoreceptors alone or in combination with RPE.

The only approved embryonic stem cell ("ESC") clinical trials currently underway in humans involve the transplantation of RPE via a simple, disorganized bolus injection of cells, or delivery of RPE on planar scaffolds. This work has demonstrated the safety of this approach. However, when photoreceptors are irreversibly lost, transplanting RPE alone will not rescue vision in advanced disease. For this to occur, light sensing photoreceptors must also be replaced. To make this prospect more complex, photoreceptors are a highly polarized, specialized cell type with apical outer segments containing light sensing photo-pigments and basal axon terminals. While transplantation of polarized photoreceptors with or without RPE presents significant challenges, microfabrication technology offers potential solutions to these issues.

Particularly, it would be advantageous if a scaffold could be prepared to provide polarization of photoreceptors, with or without RPE, to mimic native retinal tissues. It would be further advantageous if these scaffolds could provide a means to transplant organized photoreceptor tissue, with or without RPE, which may improve grafted cell survival, integration, and functional visual rescue compared to simple bolus cellular injections. Additionally, it would be desirable if better mechanical stability, higher cell density and more uniform cell distribution could be provided by the scaffolds as compared to scaffolds previously prepared.

BRIEF DESCRIPTION

The present disclosure is generally related to photoreceptor scaffolds that can be used for transplantation of organized photoreceptor tissue, with or without RPE, which may improve grafted cell survival, integration, and functional visual rescue. Particularly, the photoreceptor scaffold is structured from a biocompatible film having honeycomb reservoirs, each reservoir patterned with an array of through-holes. These scaffolds can be produced from biodegradable and non-biodegradable materials.

In one aspect, the present disclosure is directed to a scaffold comprising a cell support layer comprising at least one honeycomb-shaped reservoir, wherein the at least one honeycomb-shaped reservoir is fluidly connected to a plurality of through-holes.

In another aspect, the present disclosure is directed to a cell culture scaffold system comprising a scaffold comprising a cell support layer comprising at least one honeycomb-shaped reservoir, wherein the at least one honeycomb-shaped reservoir is fluidly connected to a plurality of through-holes, and at least one cell in the at least one honeycomb-shaped reservoir.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIG. 1A is a top view of the honeycomb scaffold showing the hexagonal-shaped reservoirs for capturing and growing photoreceptor cells with or without RPE cells. FIG. 1B is a bottom view of the honeycomb scaffold showing the through-hole channels for facilitating fluid and nutrient transport, and for guiding the basal extension of photoreceptor axons across the cylindrical through-hole channels.

FIGS. 4A-4F depict a schematic illustration of a second embodiment of the fabrication process for a silicon master mold and a hybrid-PDMS stamp, and the micromolding process of the hybrid-PDMS stamp with desired scaffold materials to fabricate a honeycomb retinal scaffold.

DETAILED DESCRIPTION

Figure 1A:
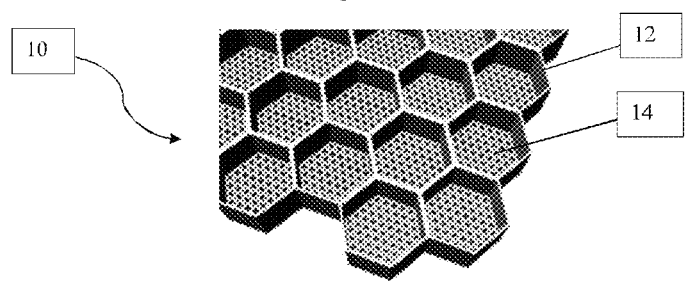
FIGS. 1A & 1B depict one exemplary scaffold of the present disclosure. Particularly.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

The present disclosure is directed to a photoreceptor scaffold for photoreceptor delivery and polarization, with or without retinal pigment epithelium (RPE). The scaffolds can be used for in vitro developmental and disease studies, as well as for drug screening. These scaffolds can further be used for transplantation of organized photoreceptor tissue, with or without RPE, which may improve grafted cell survival, integration, and functional visual rescue. The scaffolds provide improved mechanical stability by effectively distributing stress externally, higher cell density (i.e., cells captured per unit area), and more consistent cell distribution than what was capable in the art prior to the present disclosure. Further, as the honeycomb structure provides maximum cell space with minimal amount of materials, the scaffolds of the present disclosure can be prepared at a relatively lower cost.

Structure of Scaffold

Generally, a scaffold is provided for use in cell culture. The scaffold generally includes a cell support layer having at least one honeycomb-shaped reservoir fluidly connected to a plurality of through-holes. The cell support layer is typically comprised of a biocompatible flexible polymer, and in some particularly suitable embodiments, the polymer is biodegradable. The polymer can be porous or non-porous. Suitable polymers include, but are not limited to, synthetic rubbers such as silicone rubbers (e.g., polydimethylsiloxane (PDMS)), polyurethane rubber, styrene butadiene rubber, and acrylonitrile butadiene rubber, natural rubbers (e.g., poly-cis-isoprene), thermoplastic elastomers (e.g., thermoplastic polyurethane, thermoplastic copolyester, thermoplastic polyamide), epoxies (e.g., SU-8), polyimides, polyurethanes, polyamides, polyesters (e.g., poly(lactic-co-glycolic acid) (PLGA), polylactic acid (PLA), polyglycolic acid (PGA), polycaprolactone (PCL), poly(glycerol sebacate) (PGS)), poly(diol citrate), polysaccharides (e.g., chitosan), parylene, and combinations thereof. Advantageously, these polymers are "plastic-like" in that they are flexible upon application of an applied force, allowing for ease of transplantation and manipulation of the scaffold. In one particular aspect, the polymer is PDMS.

The cell support layer generally has at least two main layers: (1) one honeycomb-shaped reservoir in which photoreceptors and RPE cells can be captured and grown; and (2) through-holes connected to the honeycomb-shaped reservoir. The combination of reservoir(s) and through-holes of which extends through the cell support layer. As used herein, "honeycomb-shaped reservoir" refers to a cell reservoir having a hexagonal shape.

As used herein, "through-holes" refers to a channel that allows for exchange of fluid, waste products, and nutrients both in vitro and during scaffold degradation in vivo, and for guided growth of cells such as the basal extension of photoreceptor axons.

The scaffolds are prepared such that: 1) each hexagonal reservoir should have enough volume to fit all of the cells, for example, both photoreceptors and RPE cells; 2) each cylindrical through-hole should be narrow enough to prevent photoreceptor cells from slipping through the through-hole; 3) the height of the reservoir wall should be high (i.e, tall) enough to minimize cell migration outside of the wells; and 4) the width of the reservoir wall should be thin enough to keep the cells from sitting on top of the wall.

Figure 1B:
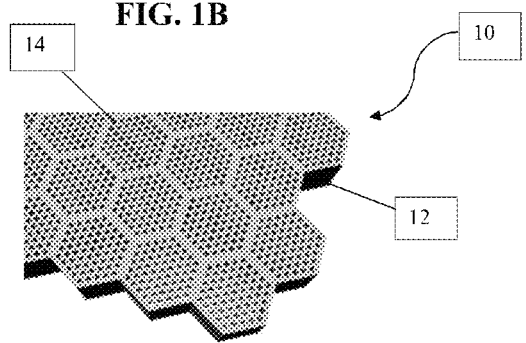

An exemplary cell support layer is shown in FIGS. 1A & 1B. As shown in FIGS. 1A & 1B, the cell support layer 10 includes at least one honeycomb-shaped reservoir 12, each reservoir 12 fluidly connected to a plurality of through-holes 14. As used herein, a "plurality" refers to at least two through-holes, including at least 3, including at least 4, including at least 5, including at least 6, including at least 7, including at least 8, including at least 9, or more through-holes. While as shown, the cell support layer 10 includes a plurality of honeycomb-shaped reservoirs 12, it should be understood by one skilled in the art that the cell support layer can include less than the plurality of honeycomb-shaped reservoirs shown, including a single honeycomb-shaped reservoir, or greater than the plurality of honeycomb-shaped reservoirs shown without departing for the scope of the present disclosure.

Figure 2:
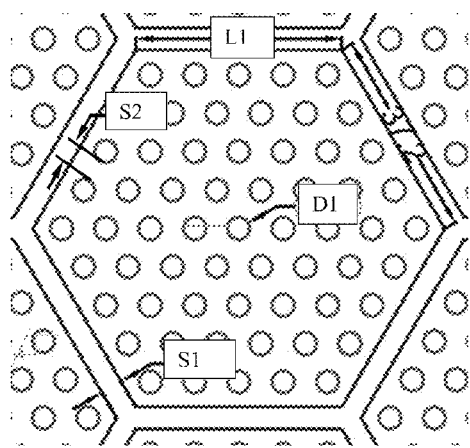
FIG. 2 depicts honeycomb-shaped cell reservoir and through-hole dimensions and spacing for use in one embodiment of the present disclosure.

In one embodiment, as shown in FIG. 2, the honeycomb-shaped reservoir 12 includes six sides (i.e., hexagon). Each side length, indicated at L1, is from about 10 μm to about 100 μm, including from about 10 μm to about 50 μm, and suitably, approximately 37.2 μm. In particularly suitable embodiments, the height of the honeycomb-shaped reservoirs, not shown, ranges from about 10 μm to about 100 μm, including approximately 40 μm.

The diameter of the through-hole 14, D1, typically ranges from about 1 μm to about 7 μm, including approximately 4 μm. Further, a single through-hole of the plurality of through-holes has a height (not shown) ranging from about 1 μm to about 25 μm, including approximately 10 μm.

When a plurality of honeycomb-shaped reservoirs are fluidly connected to through-holes, the individual honeycomb-shaped reservoirs are spaced apart (shown as "S1") by from about 1 µm to about 5 µm, including approximately 3.5 µm.

When a plurality of through-holes are fluidly connected to a honeycomb-shaped reservoir, the individual through-holes are spaced apart (shown as "S2") by from about 4 µm to about 7.5 µm.

It should be recognized by one skilled in the art that, in the case of using the scaffold for photoreceptor cells without RPE, the processes that will become the axon of the photoreceptor cells grow downward in the through-holes. The outer segment is the specialized structure of the photoreceptor that captures light with light sensitive opsin molecules (cone and rod opsin), and these form at the opposite end (i.e., top of the capture well). The photoreceptor axons relay information from photoreceptors to send to second order retinal neurons and then ultimately to the visual centers of the brain. Growing photoreceptors in a polarized manner recapitulates their normal orientation in vivo. Transplanting photoreceptors with outer segments arranged to contact the RPE and axons poised to synapse with second order neurons will promote critical interactions between these cell types, and should lead to enhanced integration of the cells and increased functional rescue of vision.

Since a high packing density of photoreceptors is important for optimal visual acuity, it is particularly advantageous that the honeycomb-shaped reservoirs provide maximum cell space (and thus, closer cultured photoreceptor cells), thus providing improved visual acuity once the scaffold is transplanted. Accordingly, in one embodiment, the cell support layer is composed of polydimethylsiloxane (PDMS), wherein the length, L1, of the honeycomb-shaped reservoir can be increased by stretching the cell support layer, and then allowing the honeycomb-shaped reservoir to resume its original length upon removal of the stretching force. Particularly, with this embodiment, one or more cells are received by the honeycomb-shaped reservoir in its stretched configuration. In particular, with this reservoir configuration, approximately 85 photoreceptors can fit into a single reservoir. Once the stretching force is removed, the cells will be held within the cell reservoir. Such an embodiment is advantageous as it allows the honeycomb-shaped reservoirs to be spaced closer together with a higher number of photoreceptor cells upon removal of the stretching force.

As discussed above, a single honeycomb-shaped reservoir 12 is fluidly connected to a plurality of through-holes 14. As used herein, "fluidly connected to" refers to the honeycomb-shaped reservoir in contact with a plurality of through-holes such that cells received by the honeycomb-shaped reservoir can move/grow between the cell reservoir and the through-hole.

In another embodiment, the cell support layer is treated and/or coated such to render the polymeric layer hydrophilic. Any methods known in the art for rendering flexible polymers hydrophilic can be used without departing from the scope of the present disclosure. For example, an oxygen plasma treatment on the surface of a polymer transforms the hydrophobic surface to hydrophilic surface by introducing polar functional groups, which yields a completely wettable surface. Accordingly, methods for surface treatment include, but are not limited to, oxygen plasma treatment, ultraviolet (UV) radiation, UV/ozone treatment, corona discharges, as well as certain types of polymer or co-polymer coatings as known in the art.

The through-holes are typically included in the scaffold to allow media and/or metabolites to flow in and out of the scaffold. In suitable embodiments, the through-holes have a diameter of about 4 µm.

Methods of Preparing the Scaffold

Figure 3:
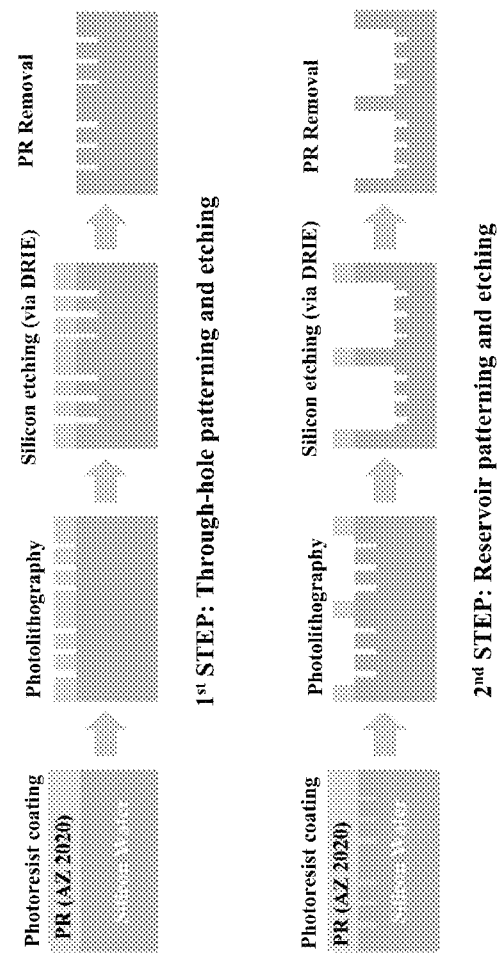
FIG. 3 depicts a schematic illustration of one embodiment of the fabrication process for the silicon wafer to generate the hard-PDMS master mold for use in making the scaffold of the present disclosure.
Figure 5A:
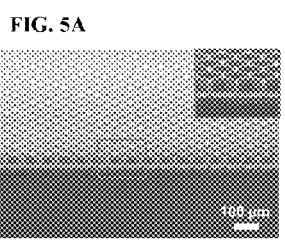
FIG. 5A depicts one exemplary silicon master mold fabricated by the silicon master mold fabrication process as shown in FIGS. 3, 4A & 4B. The inset depicts a close-up view of the exemplary silicon master mold.
Figure 5B:
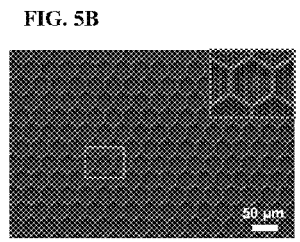
FIG. 5B depicts a top view of the exemplary silicon master mold shown in FIG. 5A. The inset depicts a close-up view of the exemplary silicon master mold.
Figure 5C:
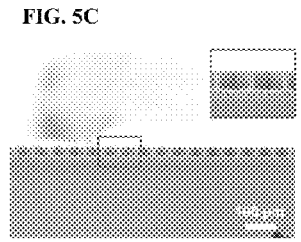
FIG. 5C depicts a cross-sectional view of the exemplary silicon master mold shown in FIG. 5A. The inset depicts a close-up view of the exemplary silicon master mold.
Figure 5D:
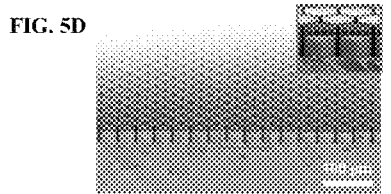
FIG. 5D depicts one exemplary hybrid-PDMS stamp fabricated by the stamp molding/demolding process as shown in FIG. 4C. The inset depicts a close-up view of the exemplary hybrid-PDMS stamp.
Figure 5E:
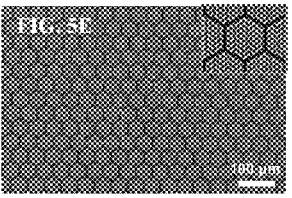
FIG. 5E depicts a top view of the exemplary hybrid-PDMS stamp shown in FIG. 5D. The inset depicts a close-up view of the exemplary hybrid-PDMS stamp.
Figure 5F:
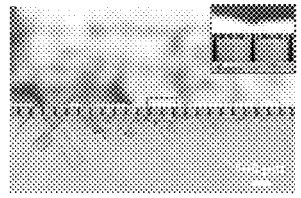
FIG. 5F depicts a cross-sectional view of the exemplary hybrid-PDMS stamp shown in FIG. 5D. The inset depicts a close-up view of the exemplary hybrid-PDMS stamp.
Figure 5G:
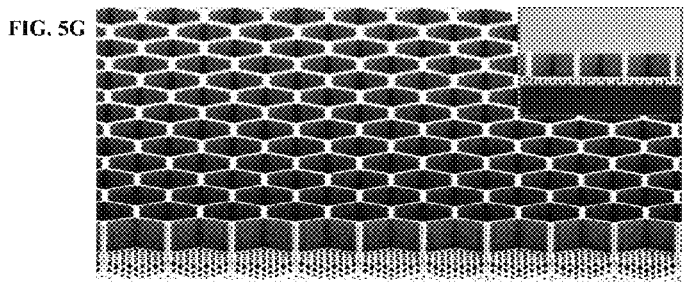
FIG. 5G depicts one exemplary PGS scaffold fabricated by the stamp mounting/demounting process and scaffold delamination process as shown in FIGS. 4D-4F. The inset depicts a cross-sectional view of the exemplary PGS scaffold.
Figure 5H:
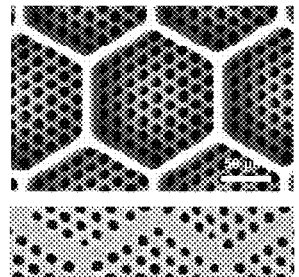
FIG. 5H depicts a close-up top view of the exemplary PGS scaffold shown in FIG. 5G.
Figure 5I:
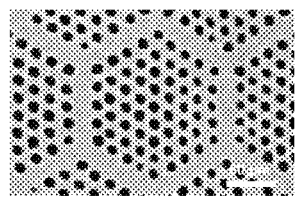
FIG. 5I depicts a close-up bottom view of the exemplary PGS scaffold shown in FIG. 5G.

As shown in FIG. 3, the scaffolds may be prepared by forming a polymeric mold for the cell support layer. For example, to prepare the scaffold, a mold having micro-scale hexagon patterns is prepared on a silicon wafer using photolithography, followed by deep reactive-ion etching (DRIE), a highly anisotropic etch process utilized for creating steep-sided holes or treaties in silicon wafers. The photoresist mask for the array of through-hole patterns is constructed first by photolithography on a silicon wafer (FIG. 3, first step). The exposed hole pattern is vertically etched via DRIE process. After the etched silicon wafer is cleaned thoroughly with solvents (e.g., acetone and isopropyl alcohol (IPA)), another photoresist mask is created on the etched silicon wafer. The second mask defines the array of honeycomb-shaped reservoirs where the multiple through-holes are covered (FIG. 3, second step). The desired number of holes, as well as the desired depths of the holes and reservoirs can be chosen at this step. The exposed hexagon area including through-holes is etched via DRIE process again. After the remaining photoresist mask on the etched silicon wafer is cleaned thoroughly with organic solvents and plasma ashing, the wafer is passivated with octafluorocyclobutane ($C_4F_8$) gas that yields a chemically inert layer similar to Teflon. The passivation layer on the etched silicon wafer prevents the casted polymer from bonding with silicon surface.

Once the silicon surface becomes hydrophobic, the elastomer stamp based on hybrid-polydimethylsiloxane (a mixture of soft-PDMS and hard-PDMS) is fabricated. Here, the hybrid-PDMS is chosen instead of soft-PDMS or hard-PDMS since it can provide an appropriate level of softness for demolding a stamp from a silicon master mold while maintaining a sufficient stiffness for firmly sustaining the molded structures from deforming, buckling, or collapsing. A liquid hybrid-PDMS mixture with a mixing ratio of 4:1 (soft-PDMS:hard-PDMS) is poured onto the fabricated silicon master mold, followed by degassing with a vacuum desiccation to remove any bubbles inside. Then, it is cured at room temperature for about 12 hours, followed by an extra curing process inside an oven at 60° C. for 2 hours, and carefully remolded from the silicon master mold. Finally, the surface of the stamp is coated with a monolayer of hydrophobic silane (an anti-stick layer under vacuum).

Thereafter, the micro molding process using the h-PDMS stamp and a poly(glycerol sebacate (PGS) prepolymer is carried out to fabricate a honeycomb retinal PGS scaffold. First, a solid PGS material is put on a clean silicon wafer and melted on a hot plate at a temperature of about 120° C. Then, the hybrid-PDMS stamp is placed against liquid PGS, and a glass slide and weight (approximately 620 g) is put on the stamp to press the stamp against the silicon wafer. Subsequently, the stamp and wafer are placed into a vacuum oven and cured at 120° C. for 72 hours. At the end of the curing process, the stamp is carefully demounted from the silicon wafer using a single razor blade and unrolled by sonic action treatment in IPA for 20 minutes. Finally, the scaffold is mounted on a transwell for cell growth. The cell seeding area of the transwell insert is approximately 19.63 $mm^2$ (internal diameter: 5 mm). It should be understood the size of the transwell insert can vary without departing from the present disclosure.

While described herein as preparing the scaffolds using photolithography, DRIE and molding, it should be understood that any means for preparing polymeric scaffolds as known in the art can be used without departing from the present disclosure. Other suitable methods include, for example, direct printing using a 3D printer or molding using a micro-injection molding machine.

Further, while described herein as using PGS, it should be understood that other biocompatible or biodegradable polymers, such as, for example, synthetic rubbers such as PDMS, silicone rubbers, polyurethane rubber, styrene butadiene rubber, acrylonitrile butadiene rubber, natural rubbers (e.g., poly-cis-isoprene), epoxies (e.g., SU-8), polyimides, poly(p-xylylene) (e.g., Parylene), polyesters (e.g., poly(lactic-co-glycolic acid) (PLGA), polylactic acid (PLA), polyglycolic acid (PGA), polycaprolactone (PCL), poly(lactide-co-ε-caprolactone (PLCL), poly(glycerol-citrate) (PGC), poly(glycerol-sebacate-citrate) (PGSC)), thermoplastic elastomers (e.g., thermoplastic polyurethane, thermoplastic copolyester, thermoplastic polyamide), aliphatic polycarbonate, polyurethanes, polysaccharides (e.g., chitosan), and combinations thereof, can be used in addition to or as an alternative to PGS without departing from the scope of the present disclosure.

Uses of the Scaffold System in Cell Culture

Advantageously, the scaffolds of the present disclosure can be used for cell culturing, transplantation, developmental modeling, disease modeling, and for drug screening.

When used for cell culture, the cell culture scaffold system generally includes a scaffold including a cell support layer. The cell support layer is typically comprised of a biocompatible or biodegradable polymer, and in some particularly suitable embodiments, the polymer is biodegradable. The polymer may be porous or nonporous. Suitable polymers include, but are not limited to, synthetic rubbers such as silicone rubbers, polyurethane rubber, styrene butadiene rubber, acrylonitrile butadiene rubber, natural rubbers (e.g., poly-cis-isoprene), epoxies (e.g., SU-8), polyimides, poly(p-xylylene) (e.g., Parylene), polyesters (e.g., poly(lactic-co-glycolic acid) (PLGA), polylactic acid (PLA), polyglycolic acid (PGA), polycaprolactone (PCL), poly(lactide-co-ε-caprolactone (PLCL), poly(glycerol sebacate) (PGS), poly(glycerol-citrate) (PGC), poly(glycerol-sebacate-citrate) (PGSC)), thermoplastic elastomers (e.g., thermoplastic polyurethane, thermoplastic copolyester, thermoplastic polyamide), aliphatic polycarbonate, polyurethanes, polysaccharides (e.g., chitosan), and combinations thereof. In one particular aspect, the polymer is PDMS. In another particular aspect, the polymer is PGS.

The cell support layer includes at least one honeycomb-shaped reservoir fluidly connected to a plurality of through-holes, the at least one honeycomb-shaped reservoir fluidly connected to the through-holes extends through the cell support layer. The honeycomb-shaped reservoir is as described above. Particularly, the honeycomb-shaped reservoir has a length that is larger than the diameter of the through-hole.

As noted above, it should be understood by one skilled in the art that the cell support layer can include more than a single honeycomb-shaped reservoir connected to the plurality of through-holes. Particularly, the cell support layer of the cell culture scaffold may include a plurality of honeycomb-shaped reservoirs, each separately fluidly connected to a plurality of through-holes without departing from the scope of the present disclosure.

When a plurality of honeycomb-shaped reservoirs are connected to through-holes, the individual honeycomb-shaped reservoirs are spaced apart by from about 1 μm to about 5 μm, including about 3.5 μm.

Typically, the cell support layer has a thickness ranging from about 11 μm to about 125 μm, including from about 25 μm to about 75 μm, and including about 50 μm.

In some embodiments, the cell support layer is treated and/or coated such to render the polymer hydrophilic as described above.

The cell culture scaffold system further includes at least one cell in the cell support layer. Cells received by the honeycomb-shaped reservoir of the cell support layer can move/grow between the honeycomb-shaped reservoir and the through-hole of the cell support layer. Any cells as known in the art for use in a scaffold system for in vitro developmental and disease studies, as well as for drug screening, could be used with the cell culture scaffold system of the present disclosure. Particularly, suitable cells include photoreceptor cells, retinal pigment epithelium (RPE) cells, bipolar cells, ganglion cells, and combinations thereof.

Use of the cell culture scaffold system results in the formation of an organized multi-cellular construct that mimics the cellular structure and organization observed in vivo, allowing for improved grafted cell survival, integration, and functional visual rescue. Further, these structures prevent reflux similar to those currently found with the use of bolus injections.

More particularly, in one suitable embodiment, the scaffold system includes at least one photoreceptor cell and at least one retinal pigment epithelium (RPE) cell in the cell support layer. Photoreceptors are the gatekeepers of vision, and they capture and transduce photos into electro-chemical signals to be processed by the retina and visual centers of the brain. Photoreceptors are highly polarized, specialized cell types with apical outer segments containing light sensing photo-pigments and basal axon terminals. As naturally found, adjacent to the photoreceptors are the RPE cells, supportive cells required for photoreceptor health and function. Particularly, an RPE monolayer provides cellular and structural cues for photoreceptor polarization. Particularly, the cell support layer is sized such to contain a monolayer of RPE at the bottom of each honeycomb-shaped reservoir and a layer of photoreceptor cells on top of the RPE. For this combined photoreceptor+RPE scaffold, the underlying through-holes will support RPE function such as metabolite, water, and waste transport. In this embodiment, once placed, the photoreceptors can start to grow their processes, which will ultimately become their outer segments towards the RPE. These polarized photoreceptors are then poised for in vitro testing or transplantation.

For a photoreceptor only application, the through-holes at the bottom of the scaffold will promote polarization, by directing extension of photoreceptor axons.

When used for transplantation, the cell culture scaffold system as described above is used to culture the cells to form a construct and then the cultured construct is transplanted to the eye of a subject using standard vitreoretinal surgical techniques. Suitable diseases and/or conditions that these constructs could be potentially used for include all inherited or acquired diseases or retinal injuries involving dysfunction and/or death of photoreceptors or the dysfunction and/or death of the RPE and photoreceptors. These include, but are not limited to, age-related macular degeneration ("dry" or "wet" AMD), retinitis pigmentosa (RP), retinal detachment, cone dystrophies, cone-rod dystrophies, Usher's syndrome, Best's disease, choroideremia, gyrate atrophy, myopic degeneration, sorsby's fundus dystrophy, doyne honeycomb macular dystrophy, and Stargardt macular dystrophy.

When the scaffold system is used for drug screening, candidate agents are added to a culture media. Cell health and survival can then be assessed using standard techniques. Additionally, the scaffold system makes it possible to examine the effects of candidate agents on cellular structures that do not typically develop without the aid of this scaffold system, such as the development of photoreceptor outer segments. Many blinding retinal disorders originate in the photoreceptor outer segment, involving an absence of photoreceptor specific protein expression, misfolded proteins, incorrect packaging of proteins, or ectopic localization of these proteins within the photoreceptor. These components of disease and potential candidates are difficult to assess in a typical two-dimensional culture system (cells grown on a flat surface). Furthermore, many diseases require modeling of RPE-photoreceptor interactions. Investigating these interactions is possible with this system, but not with traditional two-dimensional culture, as RPE and photoreceptors will not grow on top of each other in a two dimensional culture.

What is claimed is:

1. A scaffold comprising a cell support layer comprising at least one honeycomb-shaped reservoir, wherein each of the at least one honeycomb-shaped reservoir is fluidly connected to a plurality of through-holes and wherein each of the at least one honeycomb-shaped reservoir has a height ranging from about 10 µm to about 100 µm.

2. The scaffold of claim 1, wherein the cell support layer comprises a biocompatible flexible polymer.

3. The scaffold of claim 2, wherein the biocompatible flexible polymer is selected from the group consisting of silicone rubber, polyurethane rubber, styrene butadiene rubber, and acrylonitrile butadiene rubber, natural rubber, thermoplastic elastomer, epoxy, polyimide, polyurethane, polyamide, polyester, polysaccharide, parylene, and combinations thereof.

4. The scaffold of claim 2, wherein the biocompatible flexible polymer is polydimethylsiloxane (PDMS).

5. The scaffold of claim 2, wherein the biocompatible flexible polymer is poly (glycerol sebacate) (PGS).

6. The scaffold of claim 1, wherein the cell support layer comprises a biodegradable flexible polymer.

7. The scaffold of claim 1, wherein the at least one honeycomb-shaped reservoir has a length ranging from about 10 µm to about 100 µm.

8. The scaffold of claim 1, wherein a single through-hole of the plurality of through-holes has a diameter of from about 1 µm to about 7 µm.

9. The scaffold of claim 1, wherein a single through-hole of the plurality of through-holes has a height of from about 1 µm to about 25 µm.

10. The scaffold of claim 1, wherein the cell support layer comprises at least a first honeycomb-shaped reservoir and a second honeycomb-shaped reservoir, the first honeycomb-shaped reservoir spaced from about 1 µm to about 5 µm apart from the second honeycomb-shaped reservoir.

11. A cell culture scaffold system comprising a scaffold comprising a cell support layer comprising at least one honeycomb-shaped reservoir, wherein each of the at least one honeycomb-shaped reservoir is fluidly connected to a plurality of through-holes and wherein each of the at least one honeycomb-shaped reservoir has a height ranging from about 10 µm to about 100 µm, and at least one cell in the at least one honeycomb-shaped reservoir.

12. The cell culture scaffold system of claim 11, wherein the cell in the at least one honeycomb-shaped reservoir is a photoreceptor cell.

13. The cell culture scaffold system of claim 12, wherein the at least one honeycomb-shaped reservoir comprises a single photoreceptor cell.

14. The cell culture scaffold system of claim 12, wherein the at least one honeycomb-shaped reservoir comprises at least two photoreceptor cells.

15. The cell culture scaffold system of claim 11, wherein at least one honeycomb-shaped reservoir comprises a monolayer of retinal pigment epithelial cells and a layer of photoreceptor cells on top of the monolayer of retinal pigment epithelial cells.

* * * * *